United States Patent
Philbin et al.

(10) Patent No.: US 8,839,588 B2
(45) Date of Patent: Sep. 23, 2014

(54) BRACKET FOR USE WITH BOARDWALK SYSTEM

(71) Applicants: Jason Vincent Philbin, Charlotte, NC (US); Timothy Jon Beach, Beavercreek, OH (US); Robert Louis Zimmerman, Beavercreek, OH (US)

(72) Inventors: Jason Vincent Philbin, Charlotte, NC (US); Timothy Jon Beach, Beavercreek, OH (US); Robert Louis Zimmerman, Beavercreek, OH (US)

(73) Assignee: Permatrak North America LLC, Beavercreek, OH (US)

( * ) Notice: Subject to any disclaimer, the term of this patent is extended or adjusted under 35 U.S.C. 154(b) by 0 days.

(21) Appl. No.: 13/768,775

(22) Filed: Feb. 15, 2013

(65) Prior Publication Data

US 2013/0219824 A1 Aug. 29, 2013

Related U.S. Application Data

(60) Provisional application No. 61/600,183, filed on Feb. 17, 2012.

(51) Int. Cl.
| | |
|---|---|
| *E04B 1/38* | (2006.01) |
| *E04C 5/00* | (2006.01) |
| *F16B 1/00* | (2006.01) |
| *F16B 9/02* | (2006.01) |

(52) U.S. Cl.
CPC . *E04B 1/38* (2013.01); *F16B 9/026* (2013.01); *F16B 1/00* (2013.01)
USPC ............... 52/704; 52/708; 52/715; 52/745.21

(58) Field of Classification Search
CPC . E04H 12/22; E04H 12/2238; E04H 12/2253; E04H 12/2269; E04H 12/2276; E04F 11/1812; E04F 11/1817; E04F 11/1846
USPC ........... 52/153, 701, 702, 703, 704, 698, 699, 52/708, 712, 713, 714, 715, 745.21
See application file for complete search history.

(56) References Cited

U.S. PATENT DOCUMENTS

| | | | | |
|---|---|---|---|---|
| 1,375,043 | A * | 4/1921 | Finlayson | 52/126.6 |
| 1,596,039 | A | 8/1926 | Whittaker | |
| 4,007,564 | A * | 2/1977 | Chisholm | 52/98 |
| 4,081,940 | A | 4/1978 | Hughes | |
| 4,199,908 | A * | 4/1980 | Teeters | 52/295 |
| 4,260,277 | A * | 4/1981 | Daniels | 403/235 |
| 4,414,785 | A * | 11/1983 | Howell | 52/169.1 |
| 4,527,375 | A * | 7/1985 | Braginetz | 52/712 |
| 4,592,186 | A * | 6/1986 | Braginetz | 52/699 |
| 5,303,520 | A * | 4/1994 | Gozdziak | 52/92.2 |

(Continued)

OTHER PUBLICATIONS

"Technical Information—Installation Guidelines—Precast concrete boardwalk system," PermaTrak North America (May 2010).

*Primary Examiner* — Ryan Kwiecinski
(74) *Attorney, Agent, or Firm* — Thompson Hine L.L.P.

(57) ABSTRACT

A bracket system including a bracket for use with a deck or boardwalk system. The bracket has an upper portion and a lower portion at least partially spaced away from the upper portion. The bracket is configured to receive a portion of the deck or boardwalk system between said upper and lower portions. The bracket further includes a fastener extending between the upper and lower portions and configured to urge the upper and lower portions toward each other to thereby press against the portion of the deck or boardwalk system therebetween to secure the bracket to the portion of the deck or boardwalk system.

20 Claims, 4 Drawing Sheets

(56) References Cited

U.S. PATENT DOCUMENTS

| | | | |
|---|---|---|---|
| 5,307,603 A * | 5/1994 | Chiodo | 52/698 |
| 5,375,384 A * | 12/1994 | Wolfson | 52/295 |
| 5,467,569 A * | 11/1995 | Chiodo | 52/713 |
| 5,771,646 A * | 6/1998 | DeSouza | 52/263 |
| 5,906,084 A | 5/1999 | Millington et al. | |
| 6,141,928 A * | 11/2000 | Platt | 52/296 |
| 6,817,157 B2 * | 11/2004 | Bourque | 52/712 |
| 7,156,357 B1 * | 1/2007 | Kocur | 248/519 |
| 7,278,240 B2 | 10/2007 | Burkart et al. | |
| 7,306,203 B2 * | 12/2007 | Platt | 256/65.14 |
| 7,627,995 B1 * | 12/2009 | Yoder | 52/170 |
| 2002/0000076 A1 * | 1/2002 | Goeku | 52/653.1 |
| 2003/0221385 A1 * | 12/2003 | Platt | 52/296 |
| 2006/0260259 A1 | 11/2006 | Morse | |
| 2007/0267552 A1 * | 11/2007 | Meyer | 248/156 |
| 2008/0053019 A1 | 3/2008 | Rischmueller et al. | |
| 2008/0272353 A1 * | 11/2008 | Fattori | 256/19 |
| 2009/0173019 A1 * | 7/2009 | Pryor et al. | 52/167.4 |
| 2009/0301024 A1 | 12/2009 | Rischmueller et al. | |
| 2010/0186338 A1 * | 7/2010 | Rischmueller et al. | 52/650.3 |
| 2011/0041450 A1 * | 2/2011 | Espinosa | 52/698 |
| 2012/0006964 A1 * | 1/2012 | Bergman | 248/523 |
| 2012/0304571 A1 | 12/2012 | Beach et al. | |
| 2012/0317917 A1 * | 12/2012 | Hawkins et al. | 52/650.3 |

\* cited by examiner

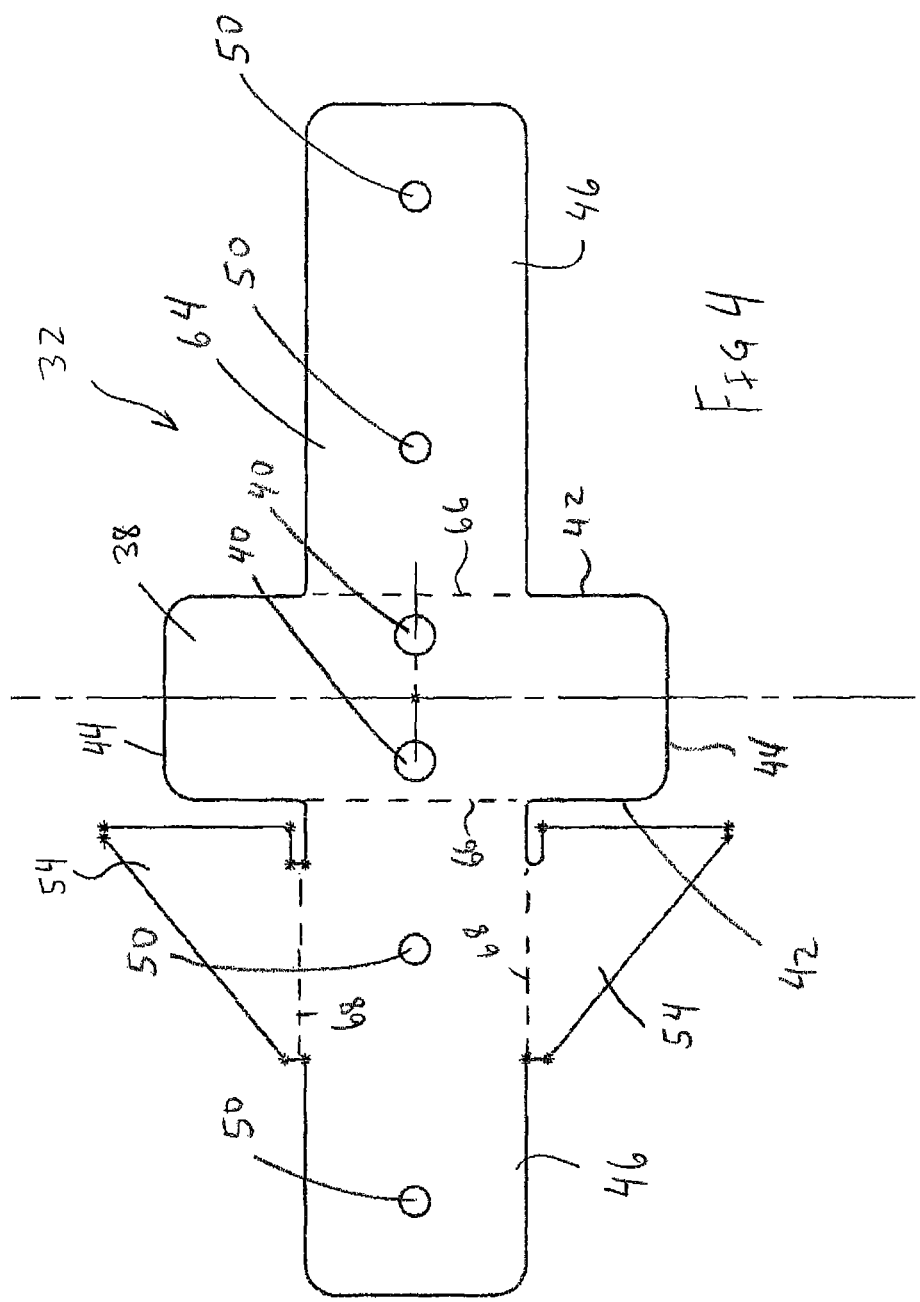

BRACKET FOR USE WITH BOARDWALK SYSTEM

This application claims priority to U.S. Provisional Patent Application Ser. No. 61/600,183, filed on Feb. 17, 2012 and entitled BRACKET FOR USE WITH BOARDWALK SYSTEM, the entire contents of which are incorporated herein.

The present invention is directed to a bracket, and more particularly, to a bracket for use with a boardwalk system.

BACKGROUND

Modular decking or boardwalk systems often include a set of generally horizontally-oriented treads that provide a generally flat surface upon which a user can walk, ride small vehicles, etc. It may be desired to attach a bracket to the boardwalk system for use in securing other components and accessories, such as hand rails, to the boardwalk system.

SUMMARY

In one embodiment, the present invention is a bracket that can be utilized to secure hand rails and other items to the boardwalk system. In particular, in one embodiment the invention is a bracket system including a bracket for use with a deck or boardwalk system. The bracket has an upper portion and a lower portion at least partially spaced away from the upper portion. The bracket is configured to receive a portion of the deck or boardwalk system between said upper and lower portions. The bracket further includes a fastener extending between the upper and lower portions and configured to urge the upper and lower portions toward each other to press against the portion of the deck or boardwalk system therebetween to secure the bracket to the portion of the deck or boardwalk system.

BRIEF DESCRIPTION OF DRAWINGS

FIG. 4 is a top view of a blank that can be used to form an upper portion of the bracket of FIG. 3.

DETAILED DESCRIPTION

Figure 1:
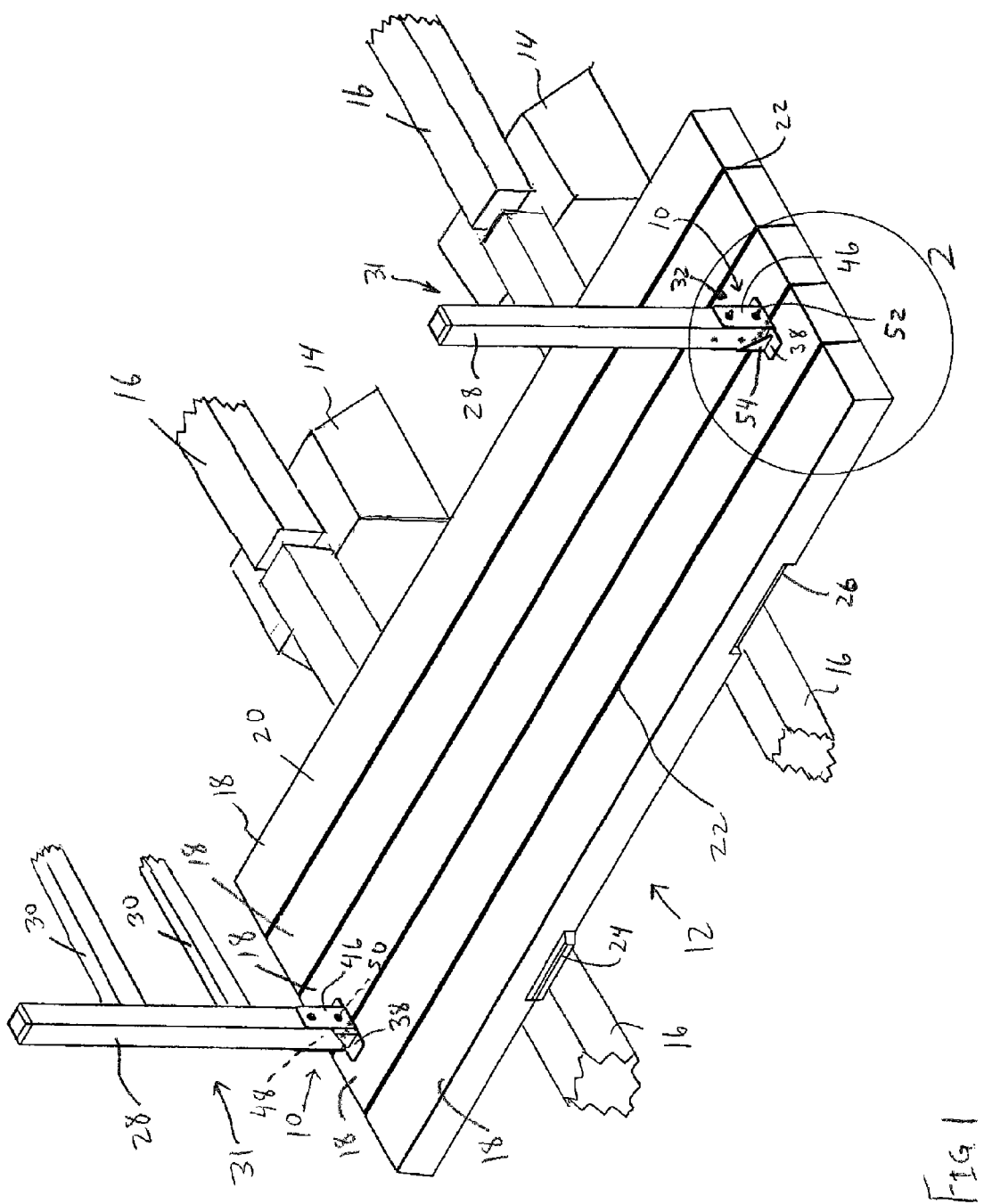
FIG. 1 is a front perspective partial cutaway view of a portion of a boardwalk system including one embodiment of the bracket of the present invention.

As shown in FIG. 1, in one embodiment the bracket 10 of the present invention can be used in conjunction with a boardwalk system or deck system 12. The boardwalk system 12 can include a plurality of piles or supports 14, each of which supports one or more horizontally-extending beams 16 thereon. Each support 14 may rest upon a ground surface and elevate the beams 16 to the desired position. The supports 12 can take any of a wide variety of shapes and configurations, as desired.

In the illustrated embodiment, each beam 16 extends between a pair of spaced supports 14, although each beam 16 can extend across multiple supports 14, and/or each support 14 may support multiple beams 16 thereon, etc. If desired, the beams 16 can be coupled to the associated support(s) 12 by any of a wide variety of coupling devices or systems (not shown).

Each beam 16 can support a plurality of generally horizontally extending treads or planks 18 thereon. In the illustrated embodiment, each tread 18 is positioned generally perpendicular to the underlying beams 16, and is supported by two parallel, spaced-apart beams 16 thereunder. However, this arrangement can be varied such that each tread 18 is supported by more than one beam 16, or by only a single beam 16, in which case the tread 18 may be supported at its other end by the earth or other structures.

In the illustrated embodiment each tread 18 is shaped as a generally rectangular prism having a flat upper surface 20. Moreover, in the illustrated embodiment, each upper surface 20 is generally flat and planar, and positioned relatively close to the upper surface 20 of an associated tread 18 such that the upper surfaces 20 together define a generally smooth surface (with gaps 22 between the treads 18, in some cases) which can be walked upon, ridden upon (by small vehicles), etc. If desired, each tread 18 may be coupled to an adjacent tread 18 by, for example, a laterally-extending tongue 24 received in an associated groove 26 in the adjacent tread 18.

The supports 14, beams 16 and treads 18 can be made from any of a wide variety of materials, including, but not limited to, wood, wood composite materials or other composite materials, concrete, or materials made entirely or primarily of concrete. Modular decking or boardwalk systems having some features similar to that shown in FIG. 1 and described herein are disclosed in U.S. Pat. No. 5,906,084 to Millington et al. and U.S. Patent Application Publication Nos. US 2009/0301024 and US 2010/0186338 to Rischmueller et al and U.S. Patent Application Publication No. 2012/0304571 to Beach et al. The entire contents of the above-identified patent and patent applications are incorporated by reference herein.

As shown in FIG. 1, a plurality of brackets 10 can be coupled to the boardwalk system 12 at various locations. In the illustrated embodiment, each bracket 10 is coupled to a tread 18 or pair of treads 18, and receives a vertically extending post 28 therein or coupled thereto. Each post 28 can be coupled to one or more generally horizontally extending rails 30, which in turn can be coupled to another post 28 to form a handrail system 31.

Figure 2:
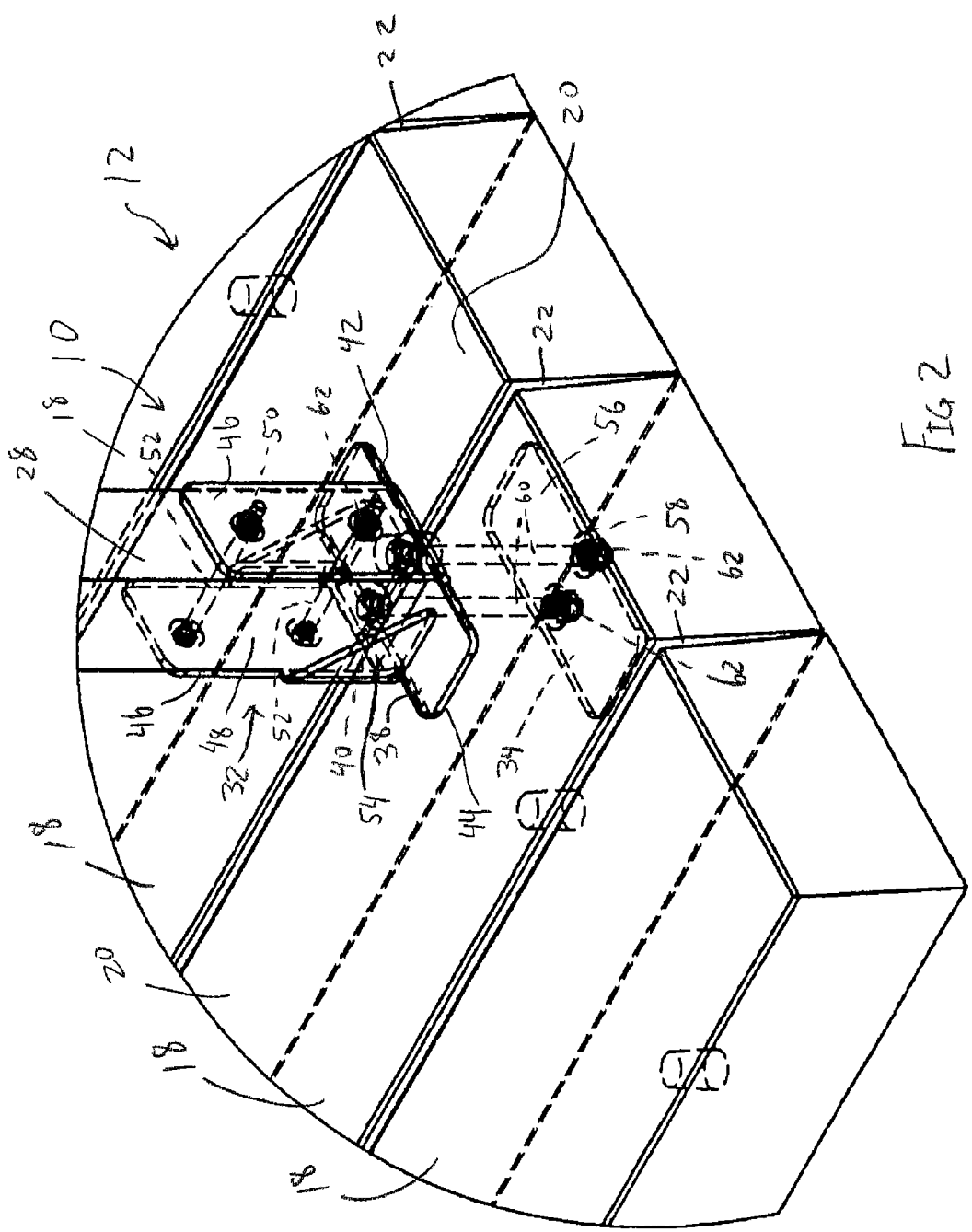
FIG. 2 is a detail perspective view of the area indicated in FIG. 1.
Figure 3:
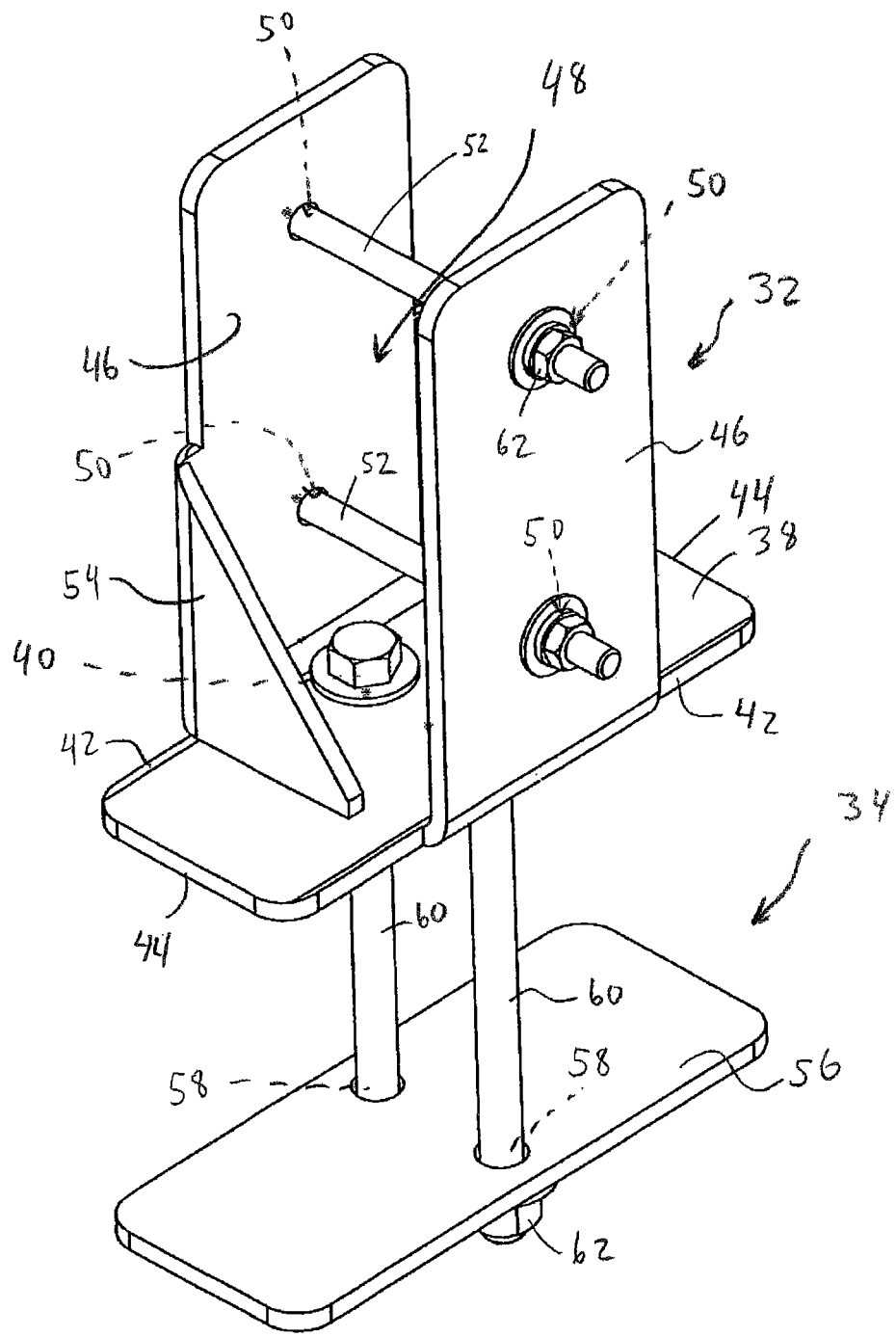
FIG. 3 is an upper perspective view of a bracket of FIG. 1.

With reference to FIGS. 2-4, each bracket 10 may include an upper portion 32 (positioned above the top surface of the treads 18, in one case) and a lower portion 34 (positioned below a bottom surface of the treads 18, in one case), with a pair of fasteners 60 extending between the upper 32 and lower 34 portions. The upper portion 32 includes a generally flat, rectangular horizontally oriented base plate 38 having a pair of openings 40 formed therethrough. The base 38 also includes a pair of side edges 42 and a pair of end edges 44 oriented perpendicular to the side edges. The upper portion 32 also includes a pair of side plates 46 positioned at the side edges 42, extending generally perpendicular to the plane of the base plate 38. The side plates 46 are generally parallel and spaced apart, and define a recess 48 therebetween. Each side plate 46 includes a pair of vertically spaced openings 50 formed therethrough, wherein the openings 50 of one side plate 46 are aligned with the openings 50 of the other side plate 46.

A securing fastener 52 is positionable through the aligned openings 50 of each side plate 46 and extends between the side plates 46, parallel to the plane of the base plate 38. The upper portion 32 may also include a pair of generally triangular tabs 54 positioned generally perpendicular to the side plates 46 and the base plate 38, further defining the recess 48. In the illustrated embodiment each tab 54 is coupled to the same side plate 46, although the tabs 54 could be coupled to differing side plates 46, or to the base 38, if desired.

The lower portion 34 of each bracket 10 includes a generally flat, rectangular support plate 56 positioned generally parallel, but spaced apart from, the base plate 38. In the illustrated embodiment the support plate 56 and base plate 38 both have generally the same size and shape. The support plate 56 has a pair of openings 58 formed therethrough and aligned with the openings 40 of the base plate 38. A pair of generally vertically oriented fasteners 60 are positionable through the aligned openings 40, 58.

In order to utilize the bracket 10, the bracket 10 may first be decoupled so that the upper 32 and lower 34 portions are not attached (although, in some cases, it may be possible or desirable to keep the bracket 10 in its coupled configuration and slide the bracket 10 into place). The bracket 10 is then positioned such that the upper portion 32 is positioned on the upper surface 20 of the boardwalk system 12, and the lower portion 34 is positioned on the lower side. The bracket 10 may be positioned such that the base plate 38 is oriented generally perpendicular to the treads 18, and adjacent to two treads 18 spanning the gap 22 therebetween, as shown in FIGS. 1 and 2. The fasteners 60 are positioned such that they extend downwardly from the base plate 38 and are positioned in a gap 22. The support plate 56 is then coupled to the fasteners 60 by passing each fastener 60 through an opening 58 and threading a nut 62 onto the fastener 60 and against the bottom surface of the support plate 56.

Once the lower portion 34/bracket 10 is in the state as shown in FIG. 2, the nuts 62 and/or the fasteners 60 can be tightened down to secure the bracket 10 in place. In particular, as the nuts 62/fasteners 60 are tightened, the treads 18 are compressed between the base plate 38 and support plate 56. Upon sufficient tightening the bracket 10 is held frictionally in place. If desired, only a single fastener 60 may be used to secure the bracket 10 in place. However, the use of two (or more) fasteners 60 can provide a greater gripping force. In addition, the use of two (or more) fasteners 60 can help to prevent spinning or rotational movement of the bracket 10. In particular, if the bracket 10 were attempted to be pivoted about a vertical axis, one or both fasteners 60 would abut against the vertical walls of the tread 18/gap 22 thereby preventing any significant rotational movement of the bracket 10.

Each of the fasteners 52, 60 shown herein take the form of a threaded fastener such as bolt/nut combination used with a washer. However, the fasteners 52, 60 can take a wide variety of forms and shapes besides threaded fasteners, such as a ratchet-style fastener, strap fastener or other arrangements. Moreover, the drawings illustrate each bracket 10 as utilizing two fasteners 52 and two fasteners 60. However, nearly any of a number of fasteners 52, 60 may be utilized, as desired.

Once the bracket 10 is secured in place, the bracket 10 provides an anchor point to which accessories can be secured. For example, in the illustrated embodiment the accessory takes the form of a handrail system 31/handrail post 28. The recess 48 of the bracket 10 can be configured to closely receive the post 28 therein, and the side plates 46 and tabs 54 form a generally continuous perimeter around at least the bottom of the post 28 to retain the post 28 in place. In particular, the post 28 may have well-known, standardized dimensions, such as (nominally) 4"×4" (in one case, having actual dimensions of about 3.5"×3.5"). In this case, the recess 48 can have a square cross section slightly larger than 3.5"×3.5" so that the post 28 can be received in the recess 48 and held in place during assembly. The post 28 may have holes formed therein, or holes can be formed therein, that are aligned with openings 50 to receive the fasteners 52 therethrough to secure the post 28 in place in the recess 48, coupled to the bracket 10, as shown in FIG. 2.

Once the bracket 10 is secured to the boardwalk system and the post 28 is secured to the bracket 10, multiple brackets 10 and posts 28 (or other accessories) can be mounted to the boardwalk system 12 in the same manner. Horizontally-extending rails 30 can then be coupled to the posts 28 to form the handrail system 31.

The system disclosed herein illustrates the bracket 10 securing a post 28 for use with a handrail system 31. However, the bracket 10 can be used as to secure and/or form nearly any desired component to the boardwalk system 12, such as barriers, supports, decorative features, benches, light posts, bicycle racks, signs, curbs, etc. In this case the upper portion 32 and/or the recess 48 can be adjusted as desired to accommodate the associated accessory.

The bracket system 10 disclosed herein enables the brackets 10 to be quickly, easily, and securely coupled to the boardwalk system 12 with a minimal use of tools. In addition, the brackets 10 can be installed without drilling any holes or otherwise modifying the treads 18 or boardwalk system 12. This can be particularly useful for boardwalk systems 12/treads 18 made of concrete or the like where drilling holes can be difficult. In addition, since the bracket system 10 can be secured without modifying the boardwalk system 12, the bracket system 10 can be easily unassembled/removed without leaving any traces behind. The bracket 10, including the upper portion 32 and lower portion 34, can be made from any of a wide variety of materials, including stainless steel or other metals, plastics, polymers, composite materials, etc., which are sufficiently durable and robust for use in decking and boardwalk applications.

The upper portion 32 of the bracket 10 can be made from a blank 64 in the form of a single, unitary seamless piece of material formed having the shape shown in FIG. 4. The piece of material 64 can include a plurality of bend lines 66, 68 (shown as dotted lines), which may not necessarily be physically included in the piece of material 64, but are shown in FIG. 4 for illustrative purpose. In order to form the upper portion 32, the side plates 46 are folded about the associated bend line 66 until the side plates 46 are oriented generally perpendicular to the base plate 38, as shown in FIG. 3. Next, the tabs 54 are folded inwardly about the associated bend lines 68 until they are generally perpendicular to the side plates 46, as shown in FIG. 3. The upper portion 32 of the bracket 10 can then be considered to be fully assembled and ready for use. The lower portion 34, when it is a flat piece of material, is easily formed by cutting a piece of material to the desired size and shape, and forming the openings 58. The fasteners 52, 60 can be standard off-the-shelf components. Thus using these steps the bracket 10 can be easily and efficiently manufactured.

Having described the invention in detail and by reference to certain embodiments, it will be apparent that modifications and variations thereof are possible without departing from the scope of the invention.

The invention claimed is:
1. A system comprising:
 a deck or boardwalk system, said deck or boardwalk system including a plurality of treads with gaps therebetween; and
 a bracket including:
  an upper portion positioned adjacent an upper surface of at least one of said plurality of treads;
  a lower portion positioned adjacent a lower surface of at least one of said plurality of treads, wherein a portion of said deck or boardwalk system is received between said upper and lower portions; and a fastener extending between said upper and lower portions and positioned in one of said gaps, said fastener being configured to urge said upper and lower portions toward each other to thereby press said portion of said deck or boardwalk system therebetween to secure said bracket to said portion of said deck or boardwalk system.

2. The system of claim 1 further including a supplemental fastener extending between said upper and lower portions and configured to urge said upper and lower portions toward each other, wherein said supplemental fastener is laterally spaced from said fastener.

3. The system of claim 2 wherein said fastener and said supplemental fastener are both positioned in the same gap.

4. The system of claim 1 wherein said upper portion is shaped to be coupled to a deck accessory or boardwalk accessory.

5. The system of claim 4 wherein said upper portion includes a recess that is generally square in cross section and is configured to closely receive a post, having a generally square cross section, therein.

6. The system of claim 4 further comprising a securing fastener attachable to said upper portion in a direction generally perpendicular to said fastener and configured to secure said upper portion to said deck accessory or said boardwalk accessory.

7. The system of claim 1 wherein said upper portion includes a base plate and a pair of side plates oriented generally perpendicular to said base plate, said side plates being generally parallel and spaced apart from each other.

8. The system of claim 1 wherein said upper portion is made of a single unitary piece of material.

9. The system of claim 1 wherein said upper portion spans said one of said gaps and is positioned adjacent an upper surface of at least two adjacent ones of said plurality of treads, said lower portion spans said one of said gaps and is positioned adjacent a lower surface of said at least two adjacent ones of said plurality of treads, and wherein said fastener extends an entire height of the associated gap.

10. The system of claim 1 wherein each of said plurality of treads is oriented generally horizontally and said fastener is oriented generally vertically.

11. The system of claim 10 wherein said upper portion receives a generally vertically extending handrail post therein.

12. The system of claim 11 further comprising a securing fastener extending through said handrail post and said upper portion to secure said handrail post to said bracket.

13. The system of claim 1 wherein each of said plurality of treads is primarily made of concrete.

14. The system of claim 1 wherein said upper portion and said lower portion are separate and discrete pieces of material.

15. The system of claim 1 wherein said one of said gaps has a height extending from an upper surface of said deck or boardwalk system to a lower, opposite surface thereof, and wherein said fastener extends the entire height of said one of said gaps.

16. The system of claim 1 wherein said fastener is not coupled to and is entirely spaced apart from any joist supporting said deck or boardwalk system thereon.

17. The system of claim 1 wherein said deck or boardwalk system has an upper surface and an opposite lower surface, and wherein said upper portion is positioned adjacent to and abuts said upper surface of said deck or boardwalk system and said lower portion is positioned adjacent to and abuts said lower surface of said deck or boardwalk system.

18. The system of claim 1 wherein each and every fastener coupled to said bracket extends between said upper and lower portions and is positioned in one of said gaps.

19. A method for using a bracket system comprising:
accessing a bracket including an upper portion, a lower portion, and a fastener;
positioning said bracket such that a portion of a deck or boardwalk system is positioned between said upper and lower portions, and said fastener extends between said upper and lower portions and is positioned in a gap between a pair of treads of said deck or boardwalk system; and
operating said fastener to urge said upper and lower portions toward each other to thereby press said upper and lower portions against said portion of said deck or boardwalk system therebetween to secure said bracket to said portion of said deck or boardwalk system.

20. The method of claim 19 wherein said pair of treads are generally horizontally oriented, and wherein said fastener is generally vertically oriented.

* * * * *